June 16, 1959     A. MATERI     2,890,904

PNEUMATIC BUMPER FOR VEHICLES

Filed Dec. 4, 1957

INVENTOR.
ANTONIO MATERI
BY

ATTORNEY

United States Patent Office 2,890,904
Patented June 16, 1959

2,890,904

PNEUMATIC BUMPER FOR VEHICLES

Antonio Materi, Bronx, N.Y.

Application December 4, 1957, Serial No. 700,601

2 Claims. (Cl. 293—71)

This invention concerns a pneumatic bumper for an automobile, bus, or similar vehicle.

It has been known heretofore to provide an inflated bumper for a vehicle. Such bumpers have conventionally been formed with casings each having a longitudinal slit for insertion of an inner tube and the casing has been backed up by an elongated metal plate. The structure was that of a conventional tire developed into elongated form from the usual toroidal form. A principal disadvantage of such prior structures is that they lacked sufficient shock absorbing capacity due to the presence of the elongated rigid backing plates. A further objection was the presence of the removable inner tube which necessitated a permanent elongated slit in the casing which weakened the casing and required the metal backing plate. The use of the removable inner tube increased the cost of assembly and repair of the bumper.

The foregoing disadvantages and difficulties of prior known inflatable bumpers have been avoided by providing a hermetically sealed casing supported at a plurality of spaced points by resilient means. The resilient supports are adjustable in length and resiliency. Because of the resilient supporting structure, a bumper of increased shock absorbing capacity is provided.

It is, therefore, a principal object of the invention to provide an inflatable rubber bumper for a vehicle, requiring no elongated backing plate.

It is a further object to provide an inflatable pneumatic bumper having a plurality of spaced, adjustable resilient supports.

It is a still further object to provide a pneumatic bumper of the character described, wherein the resilient supports are formed as rubber springs which are adjustable in length and resiliency.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
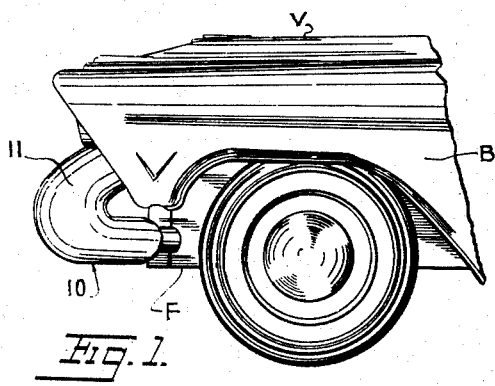
Fig. 1 is a fragmentary elevational view of a vehicle with a bumper mounted thereon embodying the invention.

Referring to Figs. 1–4, there is shown a bumper 10 in the form of a hollow rubber casing 11. The casing when inflated is arcuate in shape so that its ends curl around to protect the sides of a vehicle V as indicated in Fig. 1. A portion of the vehicle body B is broken away to show the chassis frame F on which the bumper is supported. Within the casing 11 is a rubber tube 12 which is hermetically closed and is filled with air via a valve 14 extending from the tube through the casing to the exterior of the bumper. The tube is initially inserted in the casing through a slit 15 which is then vulcanized closed to seal the tube permanently in the casing.

Figure 3:
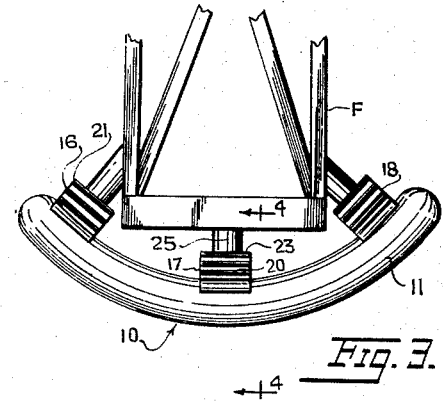
Fig. 3 is a plan view of the bumper of Fig. 1 shown attached to a vehicle chassis frame, the vehicle body being removed to show the mounting structure.

The casing has a plurality of spaced extensions 16, 17, 18 integrally formed thereon constituting four-sided blocks and extending generally radially of the casing toward the center of curvature thereof. Each extension is formed with a plurality of spaced ribs or flanges 20. Each flange is shaped so that it can be engaged in mating curved flange portions 21 of bracket plates 23. The plates 23 are secured by welding or the like to posts 25. These posts are welded or bolted to the front and sides of the chassis frame F as best shown in Fig. 3. Each extension has a plurality of flat slots or passages 26 extending therethrough. These slots serve to increase the resiliency of each extension so that the extensions serve as rubber springs supporting the bumper at spaced points. The flat slots serve the further function of permitting the extension to be cut with a sharp blade more readily to foreshorten the extension so that any one of the inner flanges 20 can be engaged in the bracket plate 23. This is an adjustable feature of the bumper mounting which adapts it to be mounted on vehicles of various sizes and shapes. Also by shortening the length of the extension, the resiliency of the bumper mounting can be adjusted at will.

When the bumper is installed on a vehicle in bracket plates 23 and is properly inflated, substantially the entire body of the bumper can flex in response to a shock or impact so that a maximum shock absorbing effect is obtained. In prior known pneumatic bumpers by contrast, a rigid supporting bar or plate extended the full length of the bumper to limit the flexibility and shock absorbing capacity.

Figure 4:
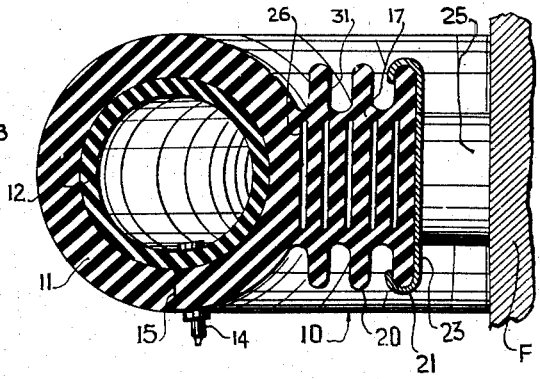
Fig. 4 is a sectional view on an enlarged scale taken on lines 4—4 of Fig. 3.
Figure 5:
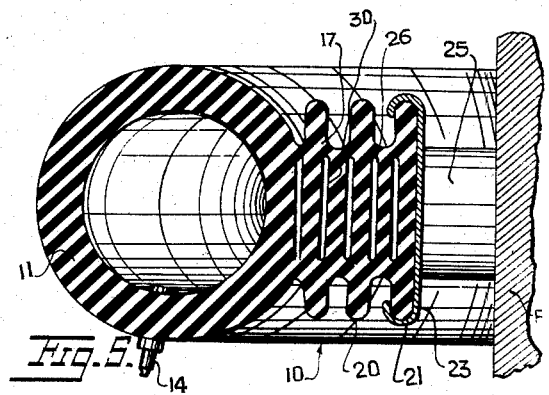
Figs. 5 and 6 are sectional views similar to Fig. 4 of other forms of the invention.
Figure 2:
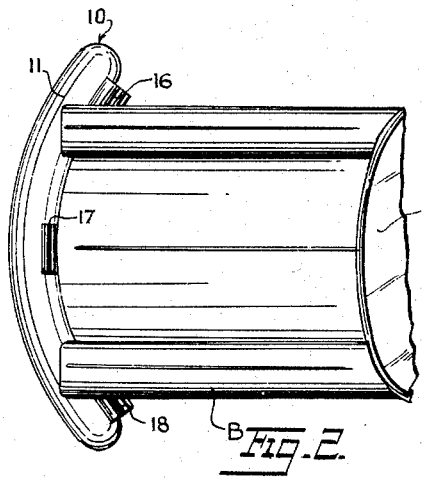
Fig. 2 is a plan view of the structure of Fig. 1.

The bumper shown in Fig. 5 is substantially the same as that of Fig. 4, except that inner tube 12 is omitted. Valve 14 extends through the hermetically sealed casing wall and serves as means for inflating and deflating the bumper.

Figure 6:
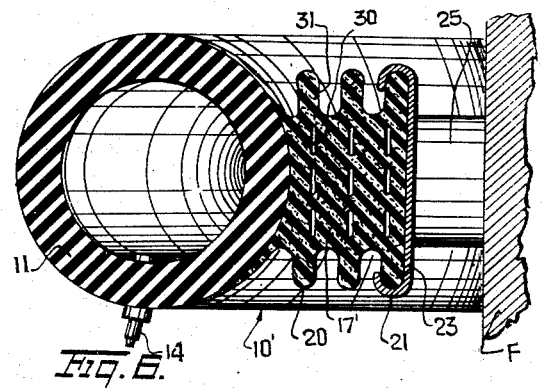

The bumper 10' shown in Fig. 6 is modified in that extension 17' is formed of rubber material of a different elasticity or flexibility from that of the body of casing 11. The extension 17' may be formed of sponge rubber vulcanized to the body of the casing 11. Flat slots 30 are disposed in alignment with each other and with the rear surfaces 31 of flanges 20. Slots 26 are similarly arranged in alignment with sides 31 of flanges 20. These slots serve to increase the flexibility of the rubber spring 17' and in addition provide means to guide a blade in cutting the rubber spring to foreshorten it as desired. If desired, a separate inner tube can be provided for the bumper 10' in the same manner as shown in Fig. 4. In order to reinforce the casing it can be formed with a plurality of cloth plies or layers embedded in the rubber body 11.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In combination, a vehicle frame, an elongated arcuate-shaped hollow rubber casing constituting a bumper, and means for resiliently securing said casing to said frame comprising a plurality of rigid posts secured to and extending outwardly from the sides and center of the frame, bracket plates supported at the outer end of the posts, opposed hooked flanges on said bracket plates and blocks integral with the casing and extending outwardly thereof at its ends and midway its ends, said blocks having four sides with spaced flanges on two opposed sides thereof, the outermost opposed flanges interlocked with the hooked flanges on the bracket plates, said blocks having recesses extending therethrough and through the other two sides thereof to provide greater flexibility to the blocks.

2. As a new article of manufacture, a shock absorbing bumper for a vehicle comprising an elongated arcuate-shaped hollow rubber casing closed at both ends, a valve carried by the casing for inflating the same with air, and radial extensions at the ends and midway the ends of the casing, said extensions constituting four-sided blocks of rubber having spaced flanges on two opposed sides thereof for attachment to a portion of a vehicle frame, said blocks having spaced recesses extending substantially across the same and extending through the other two sides to provide greater flexibility to the blocks.

References Cited in the file of this patent

UNITED STATES PATENTS

| | | |
|---|---|---|
| 1,446,708 | Kunkel | Feb. 27, 1923 |
| 1,504,828 | Moore et al. | Aug. 12, 1924 |
| 1,579,186 | Weiland | Mar. 30, 1926 |
| 1,780,908 | Clausen | Nov. 11, 1930 |
| 1,881,390 | Schmidt | Oct. 4, 1932 |
| 2,089,500 | Ochadloski | Aug. 10, 1937 |
| 2,144,357 | Booharin | Jan. 17, 1939 |
| 2,236,507 | Kreitz | Apr. 1, 1941 |